United States Patent
Ielmini et al.

(10) Patent No.: US 10,650,308 B2
(45) Date of Patent: May 12, 2020

(54) ELECTRONIC NEUROMORPHIC SYSTEM, SYNAPTIC CIRCUIT WITH RESISTIVE SWITCHING MEMORY AND METHOD OF PERFORMING SPIKE-TIMING DEPENDENT PLASTICITY

(71) Applicant: Politecnico di Milano, Milan (IT)

(72) Inventors: Daniele Ielmini, Bergamo (IT); Simone Balatti, Samolaco (IT); Stefano Ambrogio, Varese (IT); Zhongqiang Wang, Milan (IT)

(73) Assignee: POLITECNICO DI MILANO, Milan (IT)

( * ) Notice: Subject to any disclaimer, the term of this patent is extended or adjusted under 35 U.S.C. 154(b) by 1267 days.

(21) Appl. No.: 14/862,187

(22) Filed: Sep. 23, 2015

(65) Prior Publication Data

US 2017/0083810 A1 Mar. 23, 2017

(51) Int. Cl.
*G06N 3/063* (2006.01)
*G06N 3/04* (2006.01)

(52) U.S. Cl.
CPC ............. *G06N 3/063* (2013.01); *G06N 3/049* (2013.01)

(58) Field of Classification Search
CPC ............................... G06N 3/063; G06N 3/049
See application file for complete search history.

(56) References Cited

U.S. PATENT DOCUMENTS 4,874,963 A * 10/1989 Alspector ............ G06N 3/0635
706/34
4,903,226 A * 2/1990 Tsividis ................ G06N 3/063
708/801

(Continued)

FOREIGN PATENT DOCUMENTS

WO 2010133399 11/2010
WO 2012169726 12/2012

OTHER PUBLICATIONS

Ambrogio et al. Spike-timing dependent plasticity in a transistor-selected resistive switching memory. Nanotechnology 24 (2013) 384012 (9pp) (Year: 2013).*

(Continued)

*Primary Examiner* — Alexey Shmatov
*Assistant Examiner* — Robert Bejcek, II
(74) *Attorney, Agent, or Firm* — Manelli Selter PLLC; Edward Stemberger

(57) ABSTRACT

A synaptic circuit performing spike-timing dependent plasticity STDP interposed between a pre-synaptic neuron and a post-synapse neuron includes a memristor having a variable resistance value configured to receive a first signal from the pre-synaptic neuron. The circuit has an intermediate unit connected in series with the memristor for receiving a second signal from the pre-synaptic neuron and provides an output signal to the post-synaptic neuron. The intermediate unit receives a retroaction signal generated from the post-synaptic neuron and the memristor modifies the resistance value based on a delay between two at least partially overlapped input pulses, a spike event of the first signal and a pulse of the retroaction signal, in order to induct a potentiated state STP or a depressed state STD at the memristor. An electronic neuromorphic system having synaptic circuits and a method of performing spike timing dependent plasticity STDP by a synaptic circuit are also provided.

18 Claims, 7 Drawing Sheets

(56) References Cited

U.S. PATENT DOCUMENTS

| | | | | |
|---|---|---|---|---|
| 5,442,209 | A | * | 8/1995 | Chung ................ H01L 29/7831 257/270 |
| 6,459,296 | B2 | * | 10/2002 | Bradl ................... G11C 27/005 326/37 |
| 2009/0292661 | A1 | * | 11/2009 | Haas ..................... G06N 3/049 706/33 |
| 2012/0084241 | A1 | | 4/2012 | Friedman et al. |
| 2013/0031040 | A1 | * | 1/2013 | Modha .................. G06N 3/049 706/27 |
| 2014/0358834 | A1 | | 12/2014 | Kim et al. |
| 2015/0269483 | A1 | * | 9/2015 | Nishitani ............... G06N 3/084 706/25 |
| 2016/0049195 | A1 | * | 2/2016 | Yu ....................... G11C 13/0026 365/63 |

OTHER PUBLICATIONS

Subramaniam, et al. Spike-Timing-Dependent Plasticity Using Biologically Realistic Action Potentials and Low-Temperature Materials. IEEE Transactions on Nanotechnology, vol. 12, No. 3, May 2013 (Year: 2013).*

Tanachutiwat et al. FPGA Based on Integration of CMOS and RRAM. IEEE Transactions on Very Large Scale Integration (VLSI) Systems, vol. 19, No. 11, Nov. 2011 (Year: 2011).*

Indiveria et al. Integration of nanoscale memristor synapses in neuromorphic computing architectures. Nanotechnology, vol. 24, No. 38 (Year: 2013).*

NMOS logic. Wikipedia. Oct. 21, 2013. (Year: 2013).*

Brown, Bob. Transistors and Digital Logic Gates. School of computing and Software Engineering Southern Polytechnic State University. Copyright © 2000, 2002. http://ksuweb.kennesaw.edu/-rbrow211/web_lectures/transistors/ (Year: 2002).*

Wang et al. A 2-transistor/1-resistor artifical synapse capable of communication and stoachastic learning in neuromorphic systems. Frontiers in Neuroscience. vol. 8, Article 438. Jan. 2015. (Year: 2015).*

Kim et al. 2T-1R (2 transistor + 1 resistive memory per unit cell) structure for memory array for neuromorphic applications. IBM. Mar. 24, 2014. (Year: 2014).*

* cited by examiner

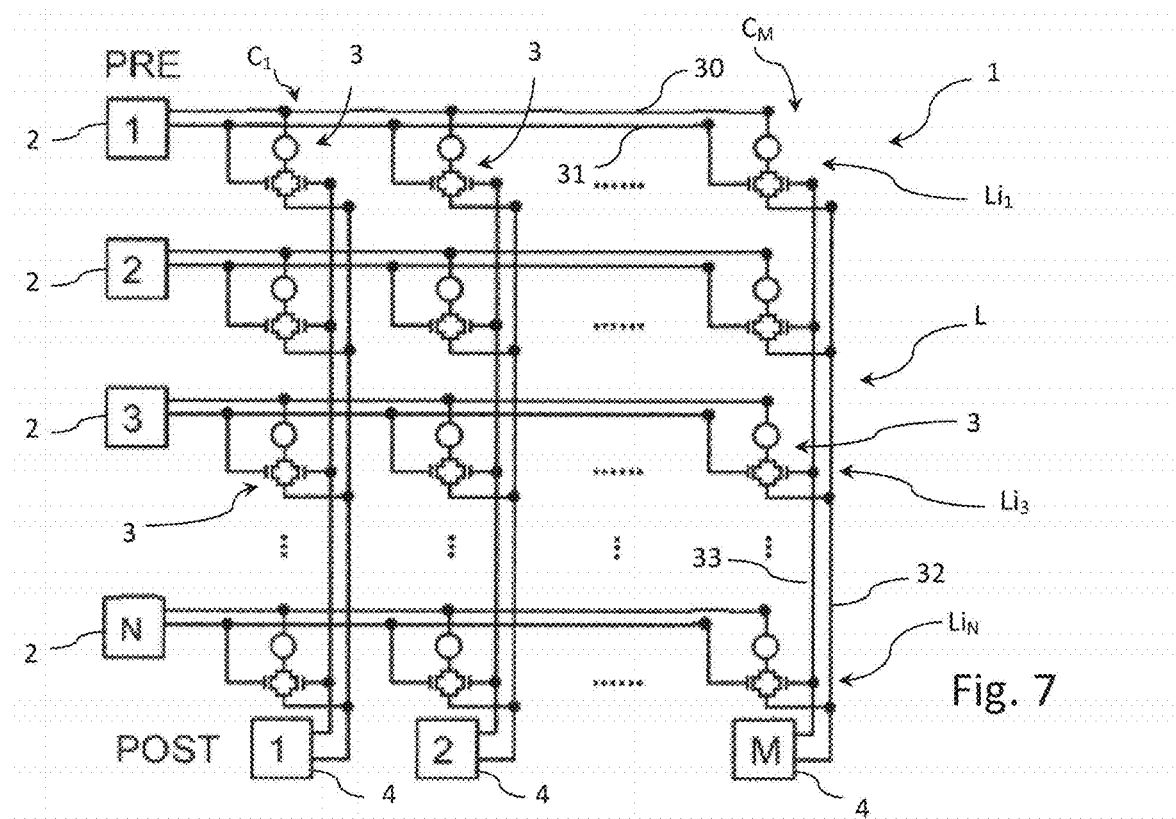
Fig. 7
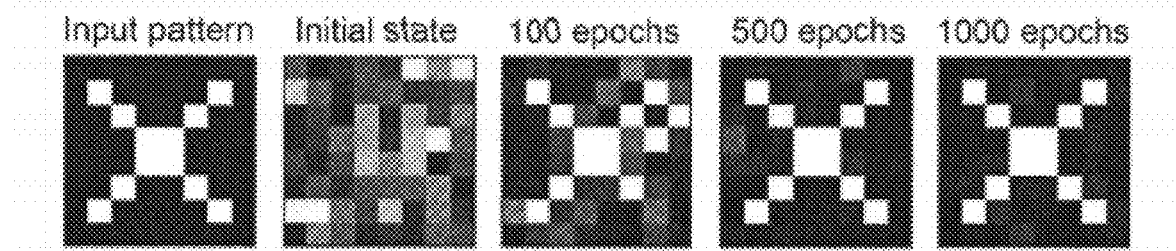
Fig. 8  Fig. 9A  Fig. 9B  Fig. 9C  Fig. 9D
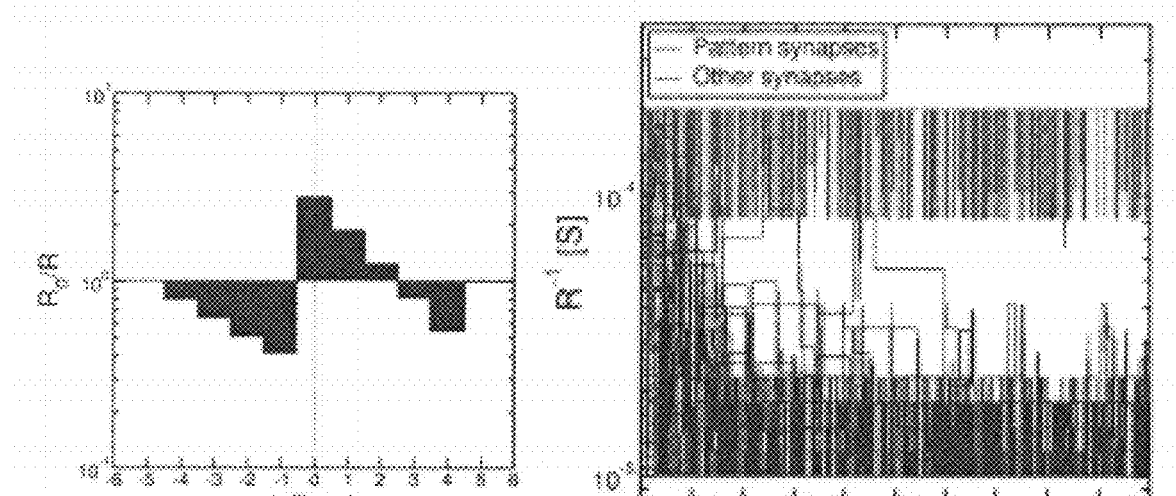
Fig. 10
Fig. 11

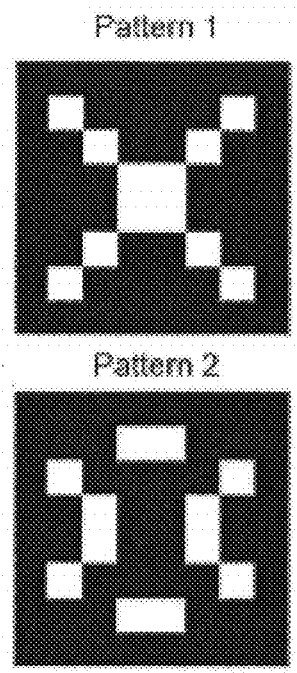
Fig. 12A
Fig. 12B
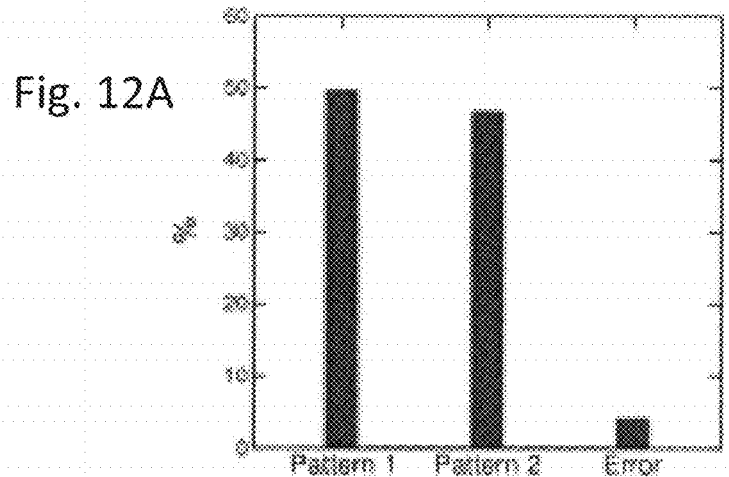
Fig. 13
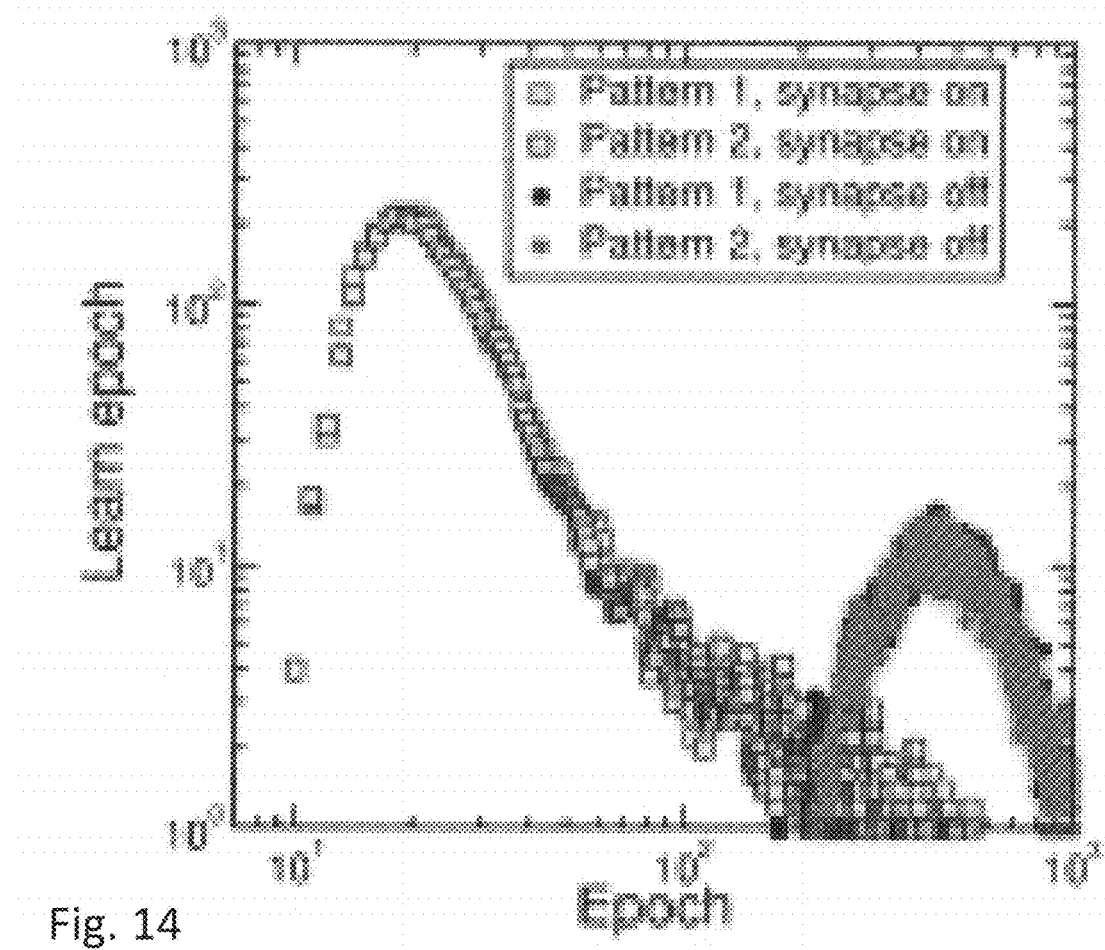
Fig. 14

ELECTRONIC NEUROMORPHIC SYSTEM, SYNAPTIC CIRCUIT WITH RESISTIVE SWITCHING MEMORY AND METHOD OF PERFORMING SPIKE-TIMING DEPENDENT PLASTICITY

TECHNICAL FIELD

The following description relates to electronic neuromorphic systems comprising synaptic circuits interposed between a pre-synaptic neuron and a post-synaptic neuron configured to perform spike-timing dependent plasticity using resistive switching memory. Moreover, the present invention relates to a method of performing spike-timing dependent plasticity.

BACKGROUND

Nowadays, brain-inspired computing is among the most challenging information and communication technologies.

The electronic neuromorphic networks are implemented to reproduce brain-like processing applications wherein principles of computation based on pattern learning and recognition are performed by neural models. The neural models use synapses or synaptic circuits to connect neurons to each other for exchanging signals. A single neuron is connected with thousands of other neurons between synapses.

Therefore, the scaling down of the sizes and complexity of the artificial synaptic circuit is one of the important tasks in the design of the electronic neuromorphic network.

A known solution for pattern learning and recognition is via software.

As alternative with respect to the known solution, the neural models comprising neuroplasticity synaptic circuits are adapted for learning and for recognizing patterns allowing to develop small sizes and low-power circuits for portable applications, as cellular phone, smart-watches and automotive device, drones and similar devices.

Moreover, the electronic neuromorphic systems by comprising neuroplasticity synaptic circuits perform energy-autonomous devices that allow interactions with the real world. These systems can be used for real-time pattern recognition in order to develop applications in monitoring environments such as public places, security places and the like.

The neuroplasticity synaptic circuits comprise a nanoscale resistive switch or memristor having an electronically-tunable conductance.

By considering the synaptic circuits, the influence that a firing spike of a pre-synaptic neuron has on a post-synaptic neuron is indicated as the synaptic circuit weight. The weight of each synaptic circuit is plastic and timing variable and the mechanism of long-term weight adaptation is known as spike-timing dependent plasticity STDP and reflects the capacity of the synaptic circuit to communicate and to modify its state. In particular, a potentiated or a depressed state of the memristor is transferred as a Long-Time Potential LTP or a Long-Time Depression LTD by the synaptic circuit.

In order to achieve a multitask operation, a known solution proposes a time-division multiplexing TDM approach wherein neuron spikes follow a precise synchronous sequence for communication, long-term potentiation LTP and long-term depression LTD.

This known approach, although advantageous for many aspects, has some drawbacks. In actual fact, synchronous clocking may be practically difficult in case of large neuromorphic systems.

Another recent solution proposes a fully asynchronous approach for communication/learning of neuromorphic synapses by using leaky-integrate-and-fire neurons in order to obtain a biological brain, where synapses are potentiated/depressed through asynchronous spike timing dependent plasticity STDP. Also, this known approach is advantageous for many aspects, but has some drawbacks.

A known solution is disclosed in application No. WO2010133399A1 relating to an electronic learning synapse with spike-timing dependent plasticity using phase change memory. Another solution is disclosed in US application No. US20140358834 relating to a synapse circuit and neuromorphic system including the same. PCT application No. WO2012169726A1 discloses a synapse for function cell of spike timing dependent plasticity, function cell of STDP. US 2012/0084241A1 discloses producing spike-timing dependent plasticity in a neuromorphic network utilizing phase change synaptic device.

A satisfactory solution of memristor synapses circuits for communication and learning with reduced sizes and complexity and low power consumption has not been achieved.

BRIEF SUMMARY

In accordance with the present invention, a synaptic circuit performing spike-timing dependent plasticity STDP is provided. The synaptic circuit is interposed between a pre-synaptic neuron and a post-synaptic neuron and comprises a memristor having a variable resistance value and configured to receive a first signal from the pre-synaptic neuron. The synaptic circuit further comprises an intermediate unit connected in series with the memristor and being configured for receiving a second signal from the pre-synaptic neuron. The intermediate unit is configured for providing an output signal to the post-synaptic neuron and further configured to receive a retroaction signal from the post-synaptic neuron. The memristor is configured to modify the resistance value based on a delay between two at least partially overlapped input pulses, a spike event of the first signal and a pulse of the retroaction signal, in order to induce a potentiated state LTP or a depressed state LTD at the memristor.

Also provided in accordance with the present invention is an electronic neuromorphic system comprising a multi-layer structure wherein an intermediate layer comprises a first set of pre-synaptic neurons and a subsequent layer comprises a second set of post-synaptic neurons, synaptic circuits performing spike-timing dependent plasticity STDP being interposed between the pre-synaptic neuron of a first set and the post-synaptic neuron of a second set. Each synaptic circuit comprises a memristor having a variable resistance value and being configured to receive a first signal from the pre-synaptic neuron. The synaptic circuit further comprises an intermediate unit connected in series with the memristor and being configured for receiving a second signal from the pre-synaptic neuron and being configured for providing an output signal to the post-synaptic neuron. The intermediate unit is further configured to receive a retroaction signal generated from the post-synaptic neuron. The memristor being configured to modify the resistance value based on a delay between two at least partially overlapped input pulses, a spike event of the first signal and a pulse of the retroaction signal, in order to induct a potentiated state STP or a depressed state STD at the memristor.

The electronic neuromorphic system has synaptic circuits that are arranged in an array that comprises N-lines and M-columns. Each line comprises a pre-synaptic neuron of the first set of the intermediate layer and each column comprises a post-synaptic neuron of the second set of the subsequent layer.

Also provided in accordance with the present invention is a method of performing spike timing dependent plasticity STDP by a synaptic circuit that comprises a memristor having a variable resistance value, the memristor being interposed between a pre-synaptic neuron and a post-synaptic neuron. The method comprises receiving a first signal from the pre-synaptic neuron, receiving a retroaction signal from the post-synaptic neuron, and modifying the resistance value based on a delay between two at least partially overlapped input pulses, a spike event of the first signal and a pulse of the retroaction signal, by inducting a potentiated state LTP or a depressed state LTD at the memristor.

BRIEF DESCRIPTION OF THE DRAWINGS

FIG. 7 shows an electronic neuromorphic system according to an embodiment of the present invention;

FIGS. 8 and 9A-9D show a first embodiment of learning process comprising a pattern sample and a resulting pattern sequence issuing from an electronic neuromorphic system according to an embodiment of the present invention;

FIGS. 10 and 11 show waveforms representing the discretized delay of the changing of the synaptic circuits and the changing of the resistance of the synaptic circuit during the learning process of FIGS. 9A-9D;

FIGS. 12A-B, 13 and 14 show a second embodiment of learning process comprising a first pattern and a second pattern randomly submitted in a system according to an embodiment of the present invention and respectively waveforms representing the results of the learning process;

DETAILED DESCRIPTION OF PRESENTLY PREFERRED EMBODIMENTS

Figure 1:
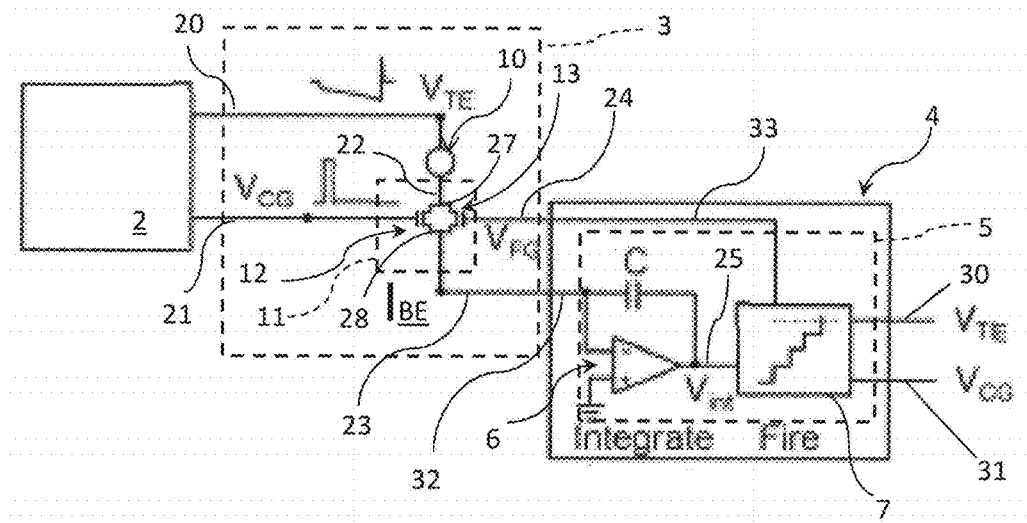
FIG. 1 shows an embodiment of a synaptic circuit according to the present invention.
Figure 2:
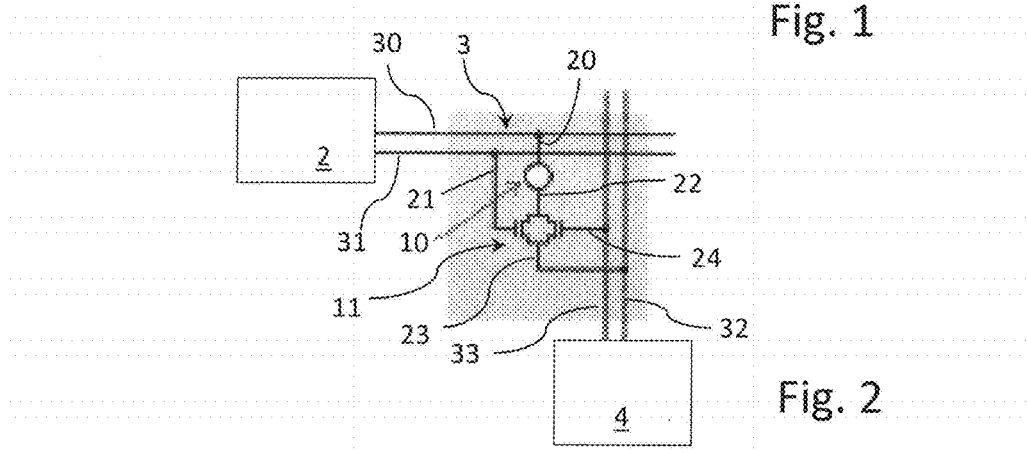
FIG. 2 is a portion of an electronic neuromorphic system comprising the synaptic circuit of FIG. 1.

With reference to FIG. 1, a synaptic circuit 3 performing spike-timing dependent plasticity STDP according to an embodiment is illustrated.

The synaptic circuit 3 is a four-terminal component interposed between a pre-synaptic neuron 2 and a post synaptic neuron 4.

The synaptic circuit 3 is configured to receive a first signal $V_{TE}$ by a first input terminal 20 connected to the pre-synaptic neuron 2, to receive a second signal $V_{CG}$ by a second input terminal 21 connected to the pre-synaptic neuron 2 and to provide an output signal $I_{BE}$ to the post-synaptic neuron 4 by an output terminal 23.

Furthermore, the synaptic circuit 3 is configured to receive a retroaction signal $V_{FX}$ by a retroaction terminal 24 connected to the post synaptic neuron 4.

The synaptic circuit 3 comprises a memristor 10 that is a two-terminal component having a variable resistance value R. The memristor 10 is interposed between the first input terminal 20 and a first inner node 27 connected by an inner terminal 22.

In the embodiment, the memristor 10 is a bipolar memristor configured to change its resistance value R depending on the voltage value applied to the terminals. In particular, having a positive voltage difference across the terminals, the resistance value R of the memristor 10 decreases while having a negative voltage difference across the terminals, the resistance value R of the memristor 10 increases.

Moreover, the bipolar memristor 10 modifies its resistance value R only if the absolute value of the difference voltage to the terminals overcomes a threshold value and below such threshold value—the bipolar memristor 10 performs as a conventional resistor having a linear time-invariant resistance value R. The bipolar memristor 10 has a set threshold value $V_{SET}$ for positive voltage value and a reset threshold value $V_{RESET}$ for negative voltage value.

Moreover, the synaptic circuit 3 comprises an intermediate unit 11 connected in series with the bipolar memristor 10.

The intermediate unit 11 is connected to the pre-synaptic neuron 2 by the second input terminal 21 and is connected to the post-synaptic neuron 4 by the output terminal 23 and by the retroaction terminal 24.

The intermediate unit 11 comprises a first transistor 12 having a control terminal coupled to the second terminal 21, a first conduction terminal connected to the first inner node 27 and a second conduction terminal connected to a second inner node 28.

Furthermore, the intermediate unit 11 comprises a second transistor 13 connected in parallel with the first transistor 12.

The second transistor 13 has a control terminal connected to the retroaction terminal 24, a first conduction terminal connected to the first inner node 27 and a second conduction terminal connected to the second inner node 28.

According to an embodiment, the first transistor 12 and the second transistor 13 are n-MOS transistors.

The memristor 10 is configured to provide a change of the resistance value R based on a delay $\Delta t$ between two at least partially overlapped input pulses received by the synaptic circuit 3.

The first input pulse being a spike event $F_{E1}$ of the first signal $V_{TE}$, which is issued from the pre-synaptic neuron 2, and the second pulse being a pulse $V_{FGMAX}$ of the retroaction signal $V_{FG}$, that is issued from the post-synaptic neuron 4 by the retroaction terminal 24.

The retroaction signal $V_{FG}$ is generated by the post-synaptic neuron 4. According to one embodiment, the post-synaptic neuron 4 generates a first signal $V_{TE}$ and a retroaction signal $V_{FG}$ having pulses that comprise exponential shapes opposite and proportional to each other, and wherein the pulses of the first signal $V_{TE}$ have spike events at the end of each pulses, as indicated below equations [1] and [2].

Figure 3:
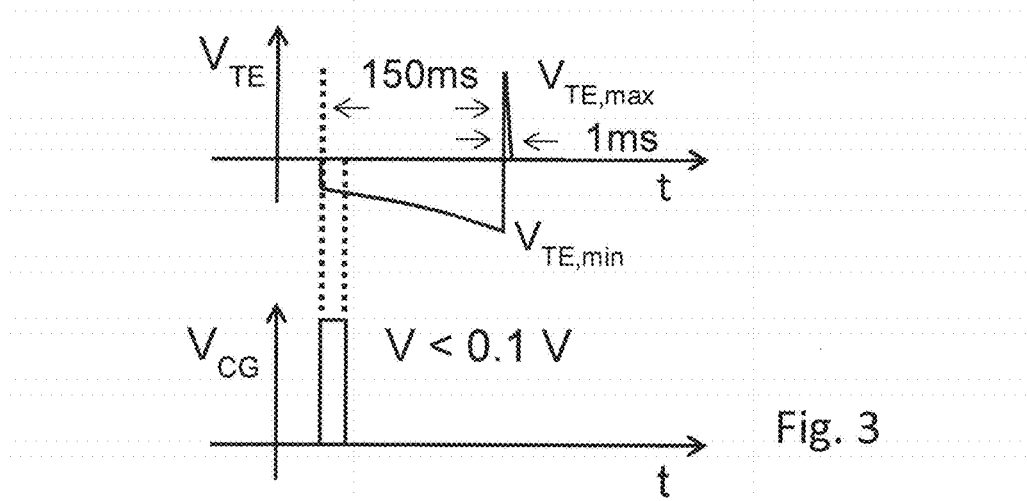
FIG. 3 is a schematic diagram of a first signal and a second signal delivered by the pre-synaptic neuron of the synaptic circuit of FIG. 1.

FIG. 3 shows the waveforms of an embodiment of the first signal $V_{TE}$ and the second signal $V_{CG}$. In particular, the first signal $V_{TE}$ comprises an exponentially-increasing negative pulse and a short positive pulse or spike event $F_{E1}$ while the second signal $V_{CG}$ is a positive pulse.

Figure 6:
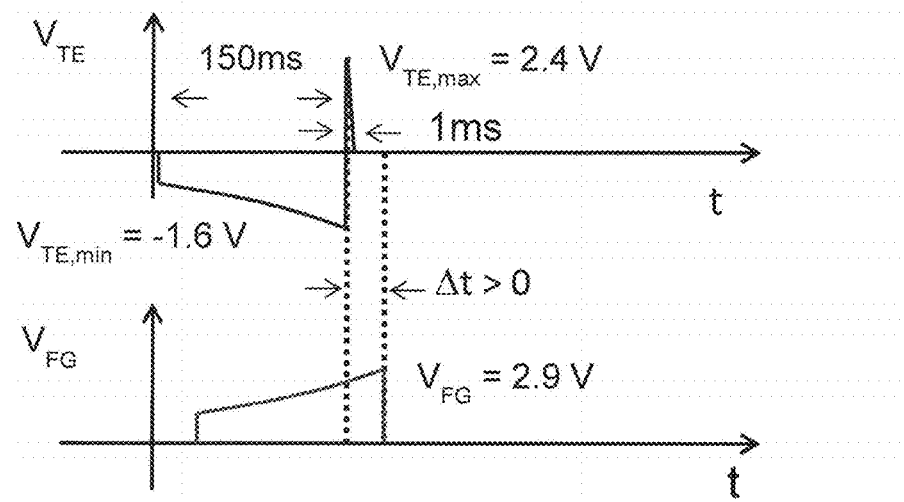
FIG. 6 shown the signal waveforms of FIG. 5 in an embodiment of the synaptic circuit.

Moreover, FIG. 6 shows the waveforms of the retroaction signal $V_{FG}$.

The parameters included in FIGS. 3 and 6 are referred to a specific embodiment and are only by way of example and not by way of limitation for the present invention.

The first signal $V_{TE}$ has an exponential shape during a time of approx. 150 ms and the end spike event $F_{E1}$ is comprised between a minimum negative value $V_{TE,min}$ of −1.6V and a maximum positive value $V_{TE,MAX}$ of 2.4V during a time interval of 1 ms, as will be described below (see equation [1]).

Referring of the retroaction signal $V_{FG}$ issued from the post-synaptic neuron 4, the pulse has an exponentially-increasing positive pulse during approximately the time of 150 ms with a maximum value $V_{FGMAX}$ of 2.9V, as will be described below (see equation [2]).

According to an embodiment, the delay Δt is defined as the time interval between the end of the pulse $V_{FGMAX}$ of the retroaction signal $V_{FG}$, that in this case is the maximum value of the pulse, and the zero-passing of the spike event $F_{E1}$ of the first signal $V_{TE}$.

When a positive delay Δt>0 or a negative delay Δt<0 occurs, there is an overlapping between the spike event $F_{E1}$ of the first signal $V_{TE}$ and the maximum pulse value $V_{FGMAX}$ of the retroaction signal $V_{FG}$ that induces a variation of the resistance value of the memristor 10 in order to induct a potentiated state LTP or a depressed state LTD at the memristor 10.

Figures 4, 5:
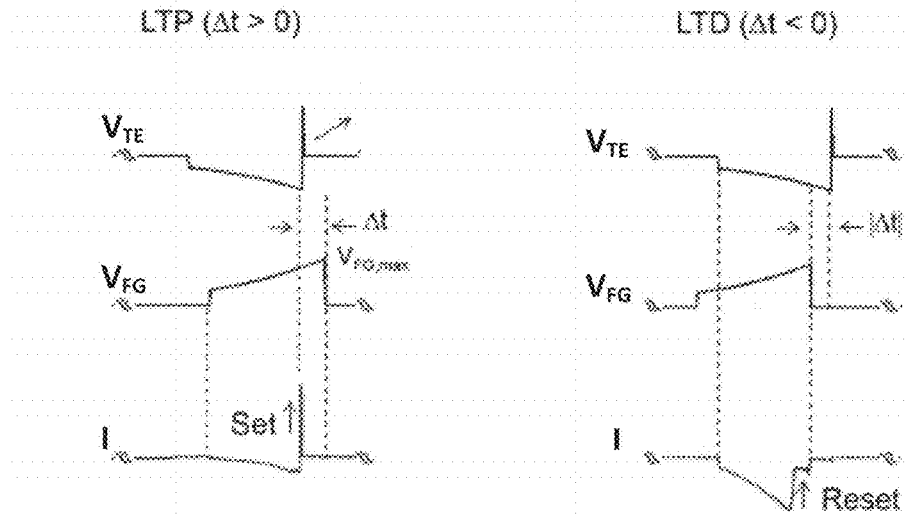
FIGS. 4 and 5 show schematic diagrams that represent signal waveforms during a potentiated state LTP and a depressed LTD state of the synaptic circuit.

FIGS. 4 and 5 show the two cases of the delay Δt generated by the pre-synaptic neuron 2 and the post-synaptic neuron 4.

As illustrated in FIG. 4, the positive delay Δt>0 occurs when the maximum pulse value $V_{FGMAX}$ of the retroaction signal $V_{FG}$ of the post synaptic neuron 4 is successive to the spike event $F_{E1}$ of the first signal $V_{TE}$ issued from the pre-synaptic neuron 2, the retroaction signal $V_{FG}$ overlaps with a positive voltage region $R_{LTP}$ the spike event $F_{E1}$ by inducing the decreasing of the resistance value R and providing the potentiated state LTP of the memristor 10.

On the other hand, when the maximum pulse value $V_{FGMAX}$ precedes the spike event $F_{E1}$, the first signal $V_{TE}$ issued from the pre-synaptic neuron 2 overlaps with a negative voltage region $R_{LTD}$ the retroaction signal $V_{FG}$ by inducing the increasing of the resistance value R and providing the depressed state LTD of the memristor 10.

As a result of the potentiated state LTP and the depressed state LTD of the memristor 10, the synaptic circuit 3 has a resistive switching memory and exhibits characteristic spike-timing dependent plasticity STDP.

Configuration of Pre and Post Synaptic Neurons

According to an embodiment, the pre-synaptic neuron 2 and the post-synaptic neuron 4 are four-terminal components and are configured to behave both as integrate and fire module 5.

Considering the post-synaptic neuron 4, as illustrated in FIG. 1, the integration and fire module 5 comprises an integration unit 6 having an operational amplifier connected in series with a fire unit 7 by an internal terminal 25.

The integration unit 6 comprises an input terminal 32 connected with the output terminal 23 to receive the output signal $I_{BE}$ from the intermediate unit 11.

According to the present embodiment, the fire module 5 comprises a first and a second output terminal, 30 and 31, and a third output terminal 33 that is the retroaction terminal 24.

The integration unit 6 is configured to integrate the output signal $I_{BE}$ and transforming the received current in an internal voltage $V_{INT}$ or membrane potential.

The fire module 7 is configured to receive the internal voltage $V_{INT}$ by the internal terminal 25 and by comprising a comparator stage that induces a fire event when the internal voltage $V_{INT}$ reaches a predetermined threshold value $V_{TH}$.

Moreover, the fire module or unit 7 is configured to provide a further first signal $V_{TE}$ by the first output terminal 30, to provide a further second signal $V_{CG}$ by the second output terminal 31 and to provide the retroaction signal $V_{FG}$ comprising the maximum pulse value $V_{FGMAX}$ once as the internal voltage $V_{INT}$ reaches the threshold value $V_{TH}$.

The integration and fire module 5 comprises an emptying unit that is configured to provide a reset state by imposing a constant predetermined voltage at the internal terminal 25. According to one embodiment, the constant predetermined voltage is the ground voltage. The emptying unit is not described in details, nor shown in figures.

Moreover, the fire unit 7 is configured to provide the second signal $V_{CG}$ that comprises the spike event $S_{E1}$ at the first integration time of the fire unit 7 after each reset state.

According to an embodiment, the following equations describe the first signal $V_{TE}$ and the retroaction signal $V_{FG}$ for the diagrams as indicated in FIGS. 4 and 5:

$$V_{TE}=-0.55*V*\exp(t/\tau) \qquad [1]$$

$$V_{FG}=1*V*\exp(t/\tau) \qquad [2]$$

wherein τ=140 ms.

As can be noted, while the first signal $V_{TE}$ and the second signal $V_{CG}$ are provided to generate a voltage-current transformation in the synaptic circuit 3, the delay Δt between the maximum pulse value $V_{FGMAX}$ of the retroaction signal $V_{FG}$ from the post-synaptic neuron 4 and the spike event $F_{E1}$ of the first signal $V_{TE}$ from the pre-synaptic neuron 2 induces a set/reset transition of the memristor 10 that provides a selective switching memory in order to potentiate or depress the synaptic circuit 3.

The learning step of a neuromorphic networks comprising synaptic circuits 3 is based on the selective change potentiated/depressed at the memristor 10.

Communication Mode of the Synaptic Circuit

During a communication mode of the synaptic circuit 3 the memristor 10 having a fixed resistance value R provides a weighted transmission of spikes from the pre-synaptic neuron 2 to the post-synaptic neuron 4. Although the voltage of the second signal $V_{CG}$ issued from the pre-synaptic neuron 2 is high, it overlaps with the low-voltage region of the first signal $V_{TE}$, which rules out any possible resistive switching of the memristor 10.

As the output signal $I_{BE}$ received at the input terminal 32 is integrated by the integration unit 6, the internal voltage $V_{INT}$ increases until the value is equal to or higher than the threshold value $V_{TH}$ of the comparator stage of the fire module 7. This event triggers the fire module 7, namely a monostable circuit, by delivering the retroaction signal $V_{FG}$ at the retroaction terminal 24 and by providing a further first signal $V_{TE}$ and a further second signal $V_{CG}$ by the first output terminal 30 and the second output terminal 31 to a further synaptic circuit 3' connected below the post-synaptic neuron 4. In this way, the post-synaptic neuron 4 corresponds to a further pre-synaptic neuron 2' for a further synaptic circuit 3'.

Positive Delay Δt>0

FIG. 4 relates to the positive delay Δt>0, wherein the spike event $F_{E1}$, 1 ms pulse, anticipates the maximum pulse value $V_{FGMAX}$ of the retroaction signal $V_{FG}$ by inducting the set transition of the memristor 10. The decrease of the resistance value R or the corresponding increase of the conductance value 1/R is dictated by the compliance current Ic flowing in the second transistor 13, hence by the gate voltage that corresponds to the retroaction voltage $V_{FG}$. Since the retroaction signal $V_{FG}$ decreases as time increases, the potentiate state LTP decreases by realizing the timing-dependent potentiate state.

Negative Delay Δt<0

FIG. 5 relates to the negative delay Δt, wherein, unlike in the positive delay, the maximum pulse value $V_{FGMAX}$ of the retroaction signal $V_{FG}$ anticipates the spike event $F_{E1}$, 1 ms pulse, by inducting the reset transition of the memristor 10. Having the disconnection of the second transistor 13, the increase of resistance value R during the reset mode is controlled by the first signal $V_{TE}$ that decreases in absolute value as time increases, thus carrying out timing-dependent depressed state LTD.

STDP Functionality

The STDP functionality results as the combination of potentiated state LTP and depressed state LTD and has been demonstrated for any arbitrary initial state of the memristor 10 of each synaptic circuit 3.

Square-Pulse STDP

Figure 15:
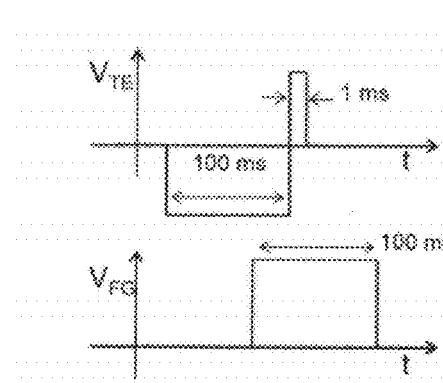
FIGS. 15 and 16 show further possible trends of signals generated in another embodiment of the synaptic circuit.
Figure 16:
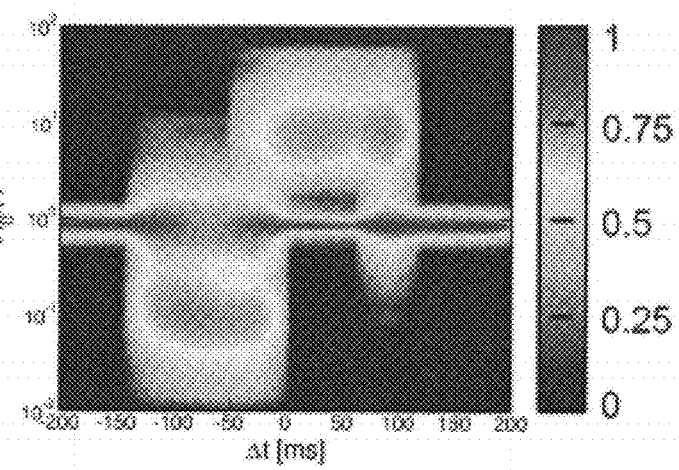

Another embodiment of the present invention can be made by providing a synaptic circuit 3 having spike-timing dependent plasticity STDP as described above and having the first signal $V_{TE}$ comprising a pulse with spike event $F_{E1}$ with rectangular shape or square pulse, as well as the pulses of the retroaction signal $V_{FG}$ with rectangular shape, as shown in FIG. 15.

The delay Δt between the spike event $F_{E1}$ and the end of the pulse $V_{FGMAX}$ issued by the retroaction signal $V_{FG}$ indices the potentiate state LTP or the depressed state LTD of the memristor 10 by providing the synaptic circuit 3 having characteristic spike-timing dependent plasticity STDP.

Electronic Neuromorphic System

The present invention is also related to an electronic neuromorphic system 1 comprising a plurality of synaptic circuits 3. In particular, the electronic neuromorphic system 1 is a multi-layer structure wherein each layer Lx comprises a plurality of pre-synaptic neurons 2 that are connected with synaptic circuits 3 to the post-synaptic neurons 4 of the subsequent layer $L_{X+1}$ Each intermediate layer $L_X$ comprises post-synaptic neurons 4 for synaptic circuits 3 connected to a previous layer $L_{X-1}$, as well as pre-synaptic neurons 2 for synaptic circuits 3 connected to a subsequent layer $L_{X+1}$.

The following description will describe portions and parts having the same function and structure as specified above and they will be indicated with the same reference numbers and signs.

FIG. 7 shows an electronic neuromorphic system 1 having two layers, the intermediate layer $L_X$ having a first set N of the pre-synaptic neurons 2 and a subsequent layer $L_{X+1}$ having a second set M of the post-synaptic neurons 4, with the synaptic circuits 3 arranged in an array (N×M) by comprising N-lines $Li_1$-$Li_N$ and M-columns $C_1$-$C_M$. In particular, each line comprises a pre-synaptic neuron 2 and M synaptic circuits 3 and each column comprises a post-synaptic neuron 4 and N synaptic circuits 3.

The pre-synaptic neuron 2 of every one of the N-line $L_1$-$L_N$ comprises a first output terminal 30 that provides the first signal $V_{TE}$ to each memristor 10 of the M synaptic circuits 3 and comprises the second output terminal 31 that provides the second signal $V_{CG}$ to the intermediate unit 11 of the same M synaptic circuits 3. In this way, the M synaptic circuits 3 of the same line $L_1$-$L_N$ are arranged in series with respect to the input.

The post-synaptic neuron 4 of each of the M-columns $C_1$-$C_M$ comprises the input terminal 32 configured to receive the output signal $I_{BE}$ from each intermediate unit 11 of the N synaptic circuit 3 of such column. Moreover, such post-synaptic neuron 4 is configured to provide the retroaction signal $V_{FG}$ to each retroaction terminal 24 connected to each synaptic circuit 3 of such column. In this way, the N synaptic circuits 3 of the same column $C_1$-$C_M$ are arranged in series with respect the output.

Thus, according to the present invention, at the fire event of the pre-synaptic neuron 2 a first signal $V_{TE}$ comprising a spike event $F_{E1}$ is provided to each first output terminal 30 of all M synaptic circuits 3 of the same line $L_1$-$L_N$ and a second signal $V_{CG}$ is provided to each one of the M synaptic circuits 3 by the second output terminal 31.

Moreover, at the fire event of the post-synaptic neuron 4 a retroaction signal $V_{FG}$ is provided to the synaptic circuits 3 comprised in the same column $C_1$-$C_M$ by the output terminal 33.

According to an embodiment, to simulate pattern learning, it is considered that the N pre-synaptic neurons 2 belong to an artificial retina providing visual stimuli corresponding to a pattern that is fed synchronously from N pre-synaptic neurons 2 to M post-synaptic neurons 4 through the array (N×M) of synaptic circuits 3.

Experimental Results: Pattern Learning

A simulated pattern learning is reproduced in FIG. 8 and FIGS. 9A-9D. The input pattern FIG. 8 is an 8×8 square pattern and the electronic neuromorphic system 1 has the intermediate layer $L_X$ having a number of 64 pre-synaptic neurons 2 connected to a number of 64 post-synaptic neurons 4 of the subsequent layer $L_{X+1}$ through (64×64) neuron circuits 3. The input pattern is fed synchronously by applying a spike for every white pixel while black pixel did not yield any spike.

During an experimental test, the input pattern was randomly alternated with random noise, consisting of 95% probability for black and 5% for white signals in each of the 64 pre-synaptic neurons 2 and wherein the duty cycle of the true input pattern was of 50%.

The evolution of the weights of each synaptic circuit 3 is indicated in FIGS. 9A-9D from the initial state to 1000 epochs wherein the input pattern is reproduced by passing through two further stages: 100 and 500 epochs.

FIG. 10 shows a conductance change according to a simplified STDP versus the epoch in the experimental embodiment, wherein the potentiated state STP was inducted for a small positive delay Δt and a depressed state STD is inducted for a negative delay Δt and for large positive delay Δt. Moreover, potentiated states in the synaptic circuit 3 were inhibited when a minimum resistance $R_{min}$=5KΩ was reached, depressed states were inhibited above a resistance $R_{MAX}$=100KΩ.

FIG. 11 shows the calculated conductance 1/R for the 64 synaptic circuits 3 comprised in a same column. According to the illustrated waveforms, starting from a uniformly distributed random initial state, the synaptic conductance, or weight, generally follows two trends, up-portion or down-portion of the graphic, increasing or decreasing with time due to repeated potentiated state LTP or depressed state LTD occurring in white and black pixel positions, respectively.

Experimental Results: Pattern Recognition During Learning

FIGS. 12A and B, and FIGS. 13 and 14 show the result of a recognition test during learning of a first input pattern 1 and a second input pattern 2. The electronic neuromorphic system 1 is the same as in the previous test, having the intermediate layer $L_X$ having a number of 64 pre-synaptic neurons 2 connected to a number of 64 post-synaptic neurons 4 included in the subsequent layer $L_{X+1}$ through (64× 64) neuron circuits 3.

The input patterns A and B had been presented in a random sequence of pattern, with 70% of probability equally distributed between first pattern 1 and second pattern 2, and random noise, with 30% of probability. First pattern 1 and second pattern 2 had been selected to have the same number of black/white pixels, to ensure a constant average retroaction signal $V_{FG}$ of each one of the post-synaptic neurons 4. The initial value of the memristors 10 of the synaptic circuits 3 was randomly distributed.

FIG. 13 shows the percentage distributions of patterns recognized after a total number of $10^3$ epochs, wherein with equal probability of about 48% first pattern 1 and second pattern 2 had been recognized, whereas an error with no recognition was approximately 4% of the case. The included minority of error is due to transition from one pattern to the other.

FIG. 14 shows the probability distribution for potentiating, first pattern 1 and second pattern 2, by starting with all memristors 10 of the synaptic circuits 3 completely potentiated. Both distributions peak at about 20 epochs, with no preference for first pattern 1 or second pattern 2.

Moreover, FIG. 14 shows the distribution of times corresponding to the depressed state at all the synaptic circuits 3 not belonging to pattern 1 or 2. The distributions show a similar behavior and peak at 500 epochs. The different timescale to the depressed state STD is related to unrelated spikes events originated by random noise, while pattern learning is linked to the density of first pattern 1 or second pattern 2 and their related input frequency.

Experimental Results: STDP Characteristics in Synaptic Circuit

Figure 17:
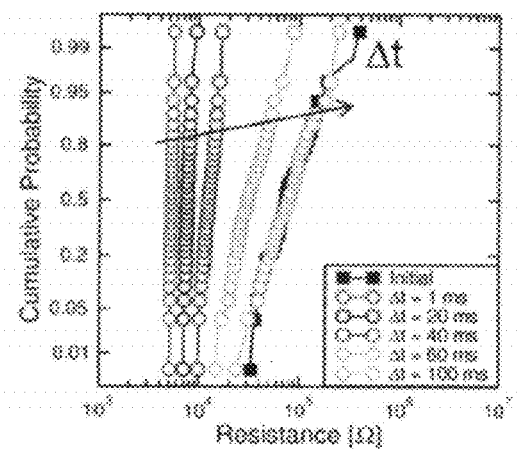
FIGS. 17-20 show cumulative distributions of resistance for variable delay and corresponding STDP characteristics.

FIG. 17 shows the cumulative distributions of measured resistance value R, in the memristor 10, for application of first signals $V_{TE}$ and retroaction signals $V_{FG}$ with respective pulses at time increasing t.

During the experimental test, the same STDP characteristic with a given delay Δt was repeated 100 times in order to allow for a sufficient statistical accuracy.

The synaptic circuit 3 was always prepared in a full reset state, corresponding to a resistance of about 100 kΩ, and the positive delay Δt was changed between 1 and 100 ms.

The distributions show a decreasing value of resistance value R in the memristor 10 at decreasing delay Δt, in agreement with the expected time depending on potentiate state LTP at the memristor 10 in FIG. 4.

Figure 18:
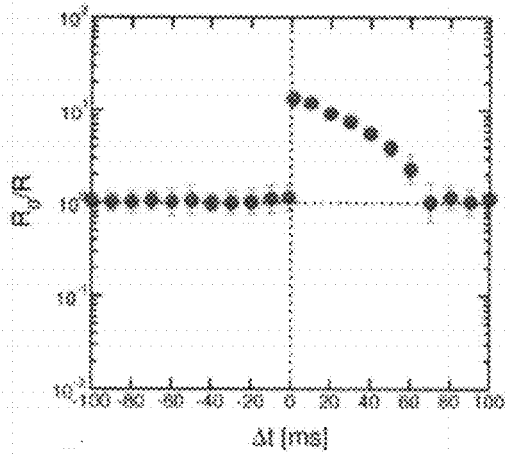

FIG. 18 shows the conductance enhancement $R_0/R$, where $R_0$ is the initial resistance and R is the median value of the distribution versus the delay Δt. While no change of resistance is obtained for delay Δt<0, the conductance value increases for positive delay Δt>0 during potentiate state LTP.

Figure 19:
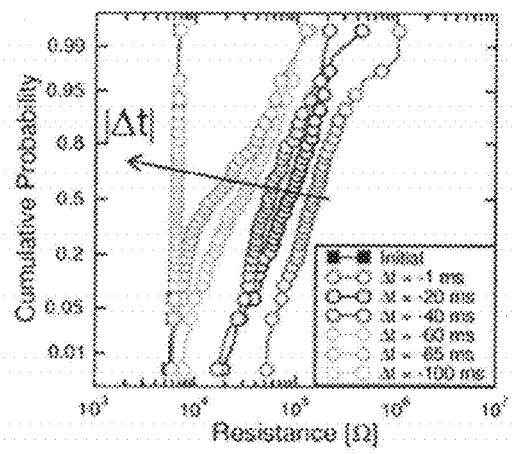

FIG. 19 shows the cumulative distribution of measured resistance R for negative delay Δt<0 in the range of delay Δt between −1 and −100 ms.

To demonstrate depressed state LTD of the memristor 10, the memristor 10 was initialized in a low resistance state with initial resistance value $R_0$ around 5 kΩ, obtained with a pulse of 1 ms at $I_C$=170 μA.

Figure 20:
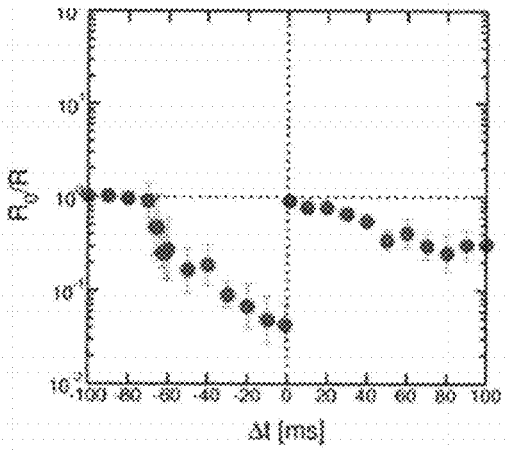

FIG. 20 shows the conductance change $R_0/R$ indicating time-dependent depressed state LTD for delay Δt<0.

The depressed state LTD can also be obtained at positive delays Δt>0, which is due to a sequence of reset and set events in the memristor 10 during the negative and positive regions of the event states of the first signal $V_{TE}$ pulse, respectively.

First, a reset transition takes place due to the negative first signal $V_{TE}$, and then the spike event 1 ms pulse induces a set transition with relatively low current $I_C$. As a result, the synaptic circuit 3 is in a set state finally, although with smaller conductance than the initial state, due to the relatively small current signal $I_C$.

Since the current signal $I_C$ decreases as positive delay Δt<0 increases, the resistance value R of the memristor 10 decreases and the depressed state LTD increases with positive delay Δt.

FIG. 20 shows as the conductance change $R_0/R$ decreases for large delays Δt in the STDP characteristic.

Figure 21:
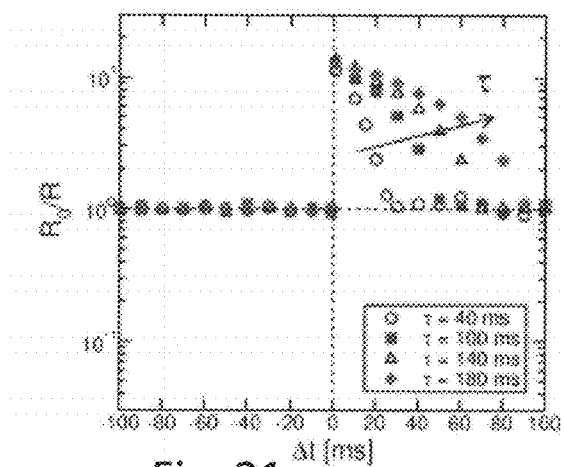
FIGS. 21 and 22 show STDP characteristics at increasing time constant $\tau$.

FIG. 21 shows STDP characteristics for variable time constant τ in the range between 40 ms and 180 ms, for the memristor 10 initially prepared in a high resistance state (a) or a low resistance state (b).

Potentiated state LTP (a) and depressed state LTD (b) characteristics show the same behavior as in FIG. 20, except for a stretching along the t axis for increasing time constant τ as a result of the change of the slope of the exponential of the first signal $V_{TE}$ and retroaction signal $V_{FG}$ pulses.

These results demonstrate that a predefined value of the time constant modifies the STDP characteristics on the timescale.

Figure 22:
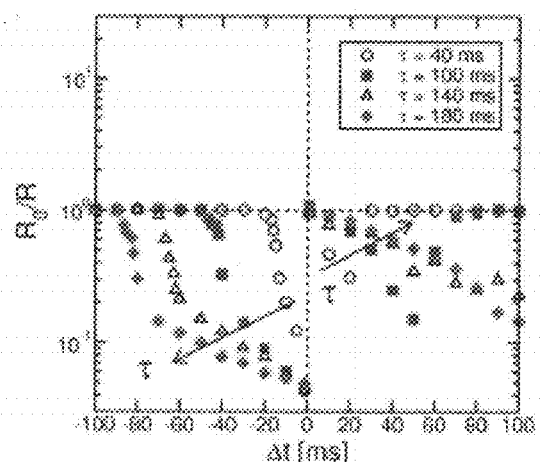

FIGS. 21 and 22 show the functionality of the STDP characteristic at increasing time constant τ for both potentiated state LTP on high-resistance states for the memristor 10 and depressed state LTD on low-resistance states at the memristor 10.

Figure 23:
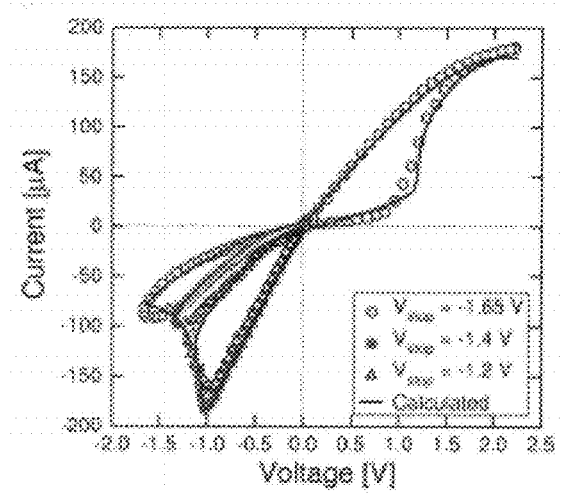
FIGS. 23 and 24 show STDP characteristics at variable high-resistance states.

FIG. 23 shows the functionality of the STDP characteristic at variable high-resistance at the memristor 10.

Figure 24:
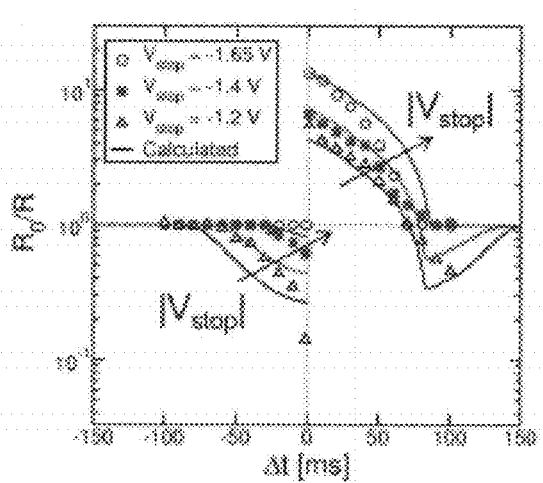

FIG. 24 shows the functionality of the STDP characteristic that increases at the potentiated state LTP and decreases at the depressed states LTD at increasing initial resistance state at the memristor 10.

Results in FIGS. 23 and 24 suggest that, for any given time t, the potentiated state LTP and the depressed state LTD of the synaptic circuit 3 also depend on the initial resistive state of the memristor 10, which introduces a certain degree of stochastic response in the STDP characteristics.

Figure 25:
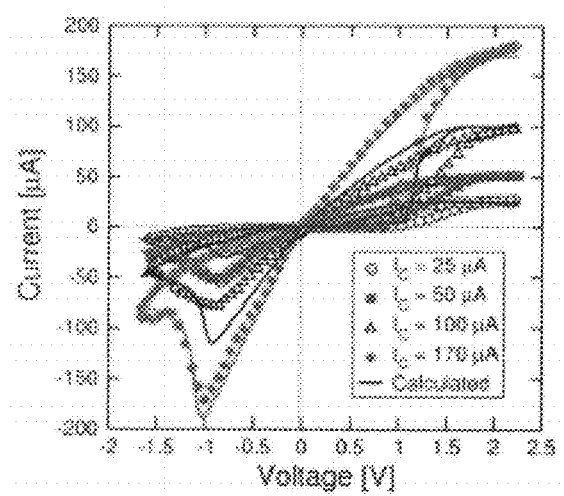
FIGS. 25 and 26 show STDP characteristics at variable low-resistance states.

FIG. 25 shows the functionality of the STDP characteristic at variable low-resistance states of the memristor 10 that are obtained by setting the memristor 10 at increasing compliance current Ic.

Figure 26:
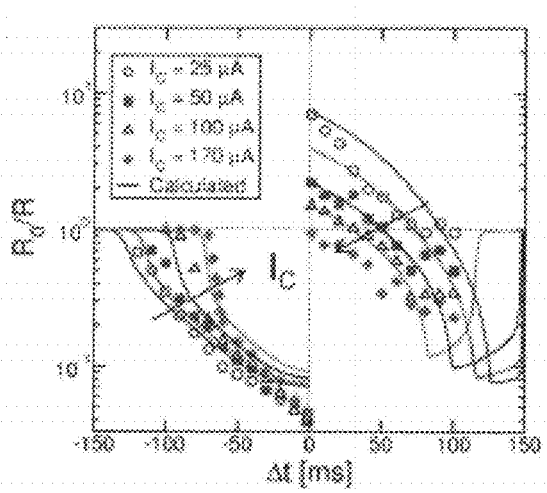

FIG. 26 shows the functionality of the STDP characteristic that increases potentiated state LTP at increasing initial resistance R, while depressed states LTD change only slightly.

Figure 27:
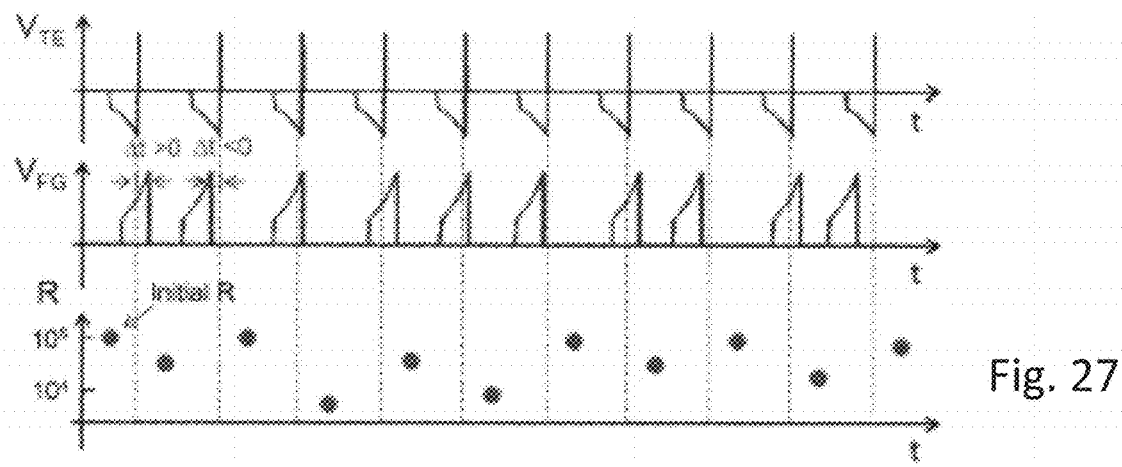
FIGS. 27-29 show STDP characteristics over a random sequence of spikes events.

FIG. 27 shows the waveforms of the first signal $V_{TE}$, of the retroaction signal $V_{FG}$ and the corresponding resistance R of the memristor 10 for a random sequence of 10 spikes.

Figures 28, 29:
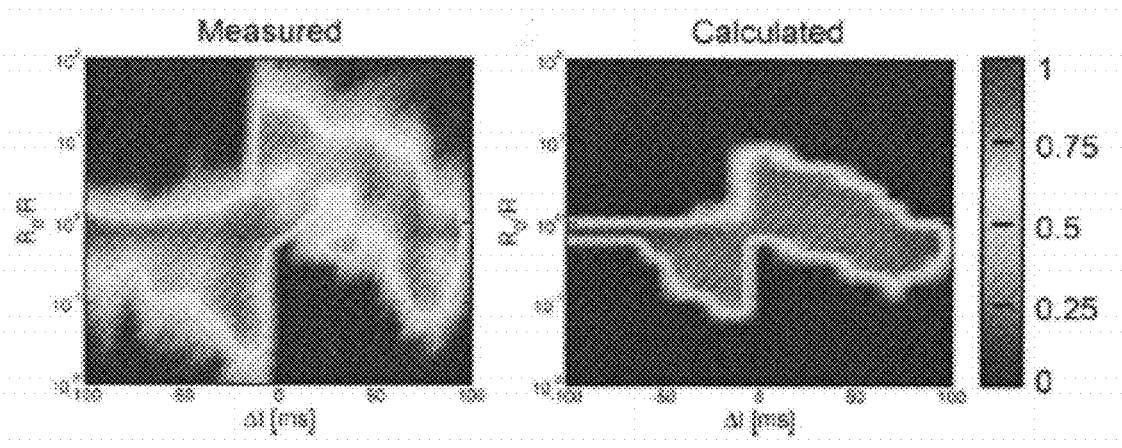

FIG. 28 shows a map of the occurence of any value of conductance change $R_0/R$ as a function of the time t for all 27,500 random spikes applied. The ratio $R_0/R$ was defined as the ratio between resistances before and after the STDP event. The maximum probability (red in the color map:

center portion) indicates LTD for negative delay Δt and for relatively large positive delay Δt, while potentiated state LTP occurs for relatively small positive delay Δt.

FIG. 29 shows a map of grey gradation of an original color map of the conductance change $R_0/R$ as a function of the delay Δt for 104 simulated sequences assuming random delay Δt. The calculated color map shows a qualitative agreement with the experimental STDP included in FIG. 28.

In some embodiments, the synaptic circuit 3 can comprise the memristor 10 implemented with a unipolar memristor, for example.

The electronic neuromorphic system having synaptic circuits with the retroaction terminals provided by the post-synaptic neurons allows learning and recognition of patterns to be achieved in real time and with low power consumption with respect to the conventional neuromorphic system.

Method of Performing Spike Timing Dependent Plasticity

The present invention is also related to a method of performing spike timing dependent plasticity STDP by a synaptic circuit 3, as described above.

The synaptic circuit 3 comprises a memristor 10 having a variable resistance value R, the memristor 10 being interposed between a pre-synaptic neuron 2 and a post-synaptic neuron 4.

The method comprises:
receiving a first signal $V_{TE}$ from the pre-synaptic neuron 2;
receiving a retroaction signal $V_{FG}$ from the post-synaptic neuron 4, and
modifying the resistance value R based on a delay Δt between two at least partially overlapped input pulses: a spike event $F_{E1}$ of the first signal $V_{TE}$ and a pulse $V_{FGMAX}$ of the retroaction signal $V_{FG}$, by inducting a potentiated state STP or a depressed state STD at the memristor 10.

The method further comprises:
connecting an intermediate unit 11 in series with the memristor 10;
receiving at the memristor 10 the first signal $V_{TE}$ issued from the pre-synaptic neuron 2;
receiving at the intermediate unit 11 a second signal $V_{CG}$ issued from the pre-synaptic neuron 2;
providing an output signal $I_{BE}$ to the post-synaptic neuron 4 by the intermediate unit 11;
receiving the retroaction signal $V_{FG}$ at the intermediate unit 11.

Furthermore, the method comprises:
providing the intermediate unit 11 by comprising a first transistor 12 and a second transistor 13, and
connecting the second transistor 13 in parallel with the first transistor 12 interposed between a first inner node 27 and a second inner node 28,
connecting the memristor 10 to the first inner node 27 and connecting the post-synaptic neuron 4 to the second node 28 by an output terminal 23.

The method further comprises decreasing the resistance value R of the memristor 10 when the pulse $V_{FGMAX}$ of the retroaction signal $V_{FG}$ is successive to the spike event $F_{E1}$ of the first signal $V_{TE}$ issued from the pre-synaptic neuron 2. In this way, the potentiated state LTP at the memristor 10 is provided.

Moreover, the method comprises increasing the resistance value R of the memristor 10 when the pulse $V_{FGMAX}$ of the retroaction signal $V_{FG}$ precedes the spike event $F_{E1}$ of the first signal $V_{TE}$ issued from the pre-synaptic neuron 2. In this way, the depressed state LTD at the memristor 10 is provided.

The method further comprises the synaptic circuit 3 comprising a bipolar memristor 10 configured to change its resistance value R depending on the voltage value applied to the terminals.

According to the present invention, the synaptic circuit with resistive switching memory having the retroaction terminal allows to communicate and to modify the communication by the potentiated state or the depressed state at the memristor obtained as a result of the delay between pulses within a short time of pulse signals delivered by the pre-synaptic neurons and the post-synaptic neurons in the artificial neural network.

The variability of the positive and the negative delays between pulses in the synaptic circuit during experiments with integrated artificial network allows learning and recognition of patterns to be achieved in real time and with low power consumption.

Having thus described at least one illustrative embodiment of the invention, various alterations, modifications, and improvements will readily occur to those skilled in the art. Such alterations, modification and improvements are intended to be within the spirit and scope of the invention. Accordingly, the foregoing description is by way of example only and is not intended as limiting. The invention is limited only as defined in the following claims and equivalents thereto.

The invention claimed is:

1. A synaptic circuit performing spike-timing dependent plasticity (STDP) interposed between a pre-synaptic neuron and a post-synapse neuron and comprising:
a memristor having a variable resistance value (R) and being configured to receive a first signal ($V_{TE}$) from the pre-synaptic neuron;
transistor structure connected in series with the memristor and being configured for receiving a second signal ($V_{CG}$) from the pre-synaptic neuron and being configured for providing an output signal ($I_{BE}$) to the post-synaptic neuron,
wherein the transistor structure is further configured to receive a retroaction signal ($V_{FG}$) generated from the post-synaptic neuron, and
the memristor is configured to modify the resistance value (R) based on a delay (Δt) between two at least partially overlapped input pulses, a spike event ($F_{E1}$) of the first signal ($V_{TE}$) and a pulse ($V_{FGMAX}$) of the retroaction signal ($V_{FG}$), in order to induct a potentiated state (STP) upon a decreasing the resistance value (R) and a depressed state (STD) upon increasing the resistance value (R) at the memristor, and
wherein the transistor structure comprises a first transistor and a second transistor that are connected in parallel and are interposed between a first inner node and a second inner node of the transistor structure, the first transistor having a control terminal coupled to the pre-synaptic neuron for receiving the second signal ($V_{CG}$) and the second transistor having a control terminal connected to the post-synaptic neuron for receiving the retroaction signal ($V_{FG}$), and
wherein the memristor is a two terminals memristor interposed between the first input terminal and the first inner node.

2. The synaptic circuit of claim 1, wherein the first transistor and the second transistor are n-MOS transistors.

3. The synaptic circuit of claim 1, wherein the memristor is a bipolar memristor.

4. The synaptic circuit of claim 1, wherein the resistance value (R) is configured to decrease by inducting the potentiated state (LTP) at the memristor when the pulse ($V_{FGMAX}$) of the retroaction signal ($V_{FG}$) is successive to the spike event ($F_{E1}$) of the first signal ($V_{TE}$).

5. The synaptic circuit of claim 1, wherein the resistance value (R) is configured to increase by inducting the depressed state (LTD) at the memristor when the pulse ($V_{FGMAX}$) of the retroaction signal ($V_{FG}$) precedes the spike event ($F_{E1}$) of the first signal ($V_{TE}$).

6. The synaptic circuit of claim 1, wherein the pre-synaptic neuron and the post-synaptic neuron are each constructed and arranged to integrate a signal and to induce a fire event.

7. The synaptic circuit of claim 6, wherein the post-synaptic neuron comprises an integration unit having an operational amplifier connected in series by an internal terminal with a fire unit comprising a comparator stage, the integration unit being configured to integrate an output signal ($I_{BE}$) issued from the transistor structure and to generate an internal voltage ($V_{INT}$) at the internal terminal the fire unit being configured to generate:
  a further first signal ($V_{TE}$) by a first output terminal,
  further second signal ($V_{CG}$) by a second output terminal and
  the retroaction signal ($V_{FG}$) by the retroaction terminal.

8. The synaptic circuit of claim 7, wherein the post-synaptic neuron is configured to provide a reset state by imposing a constant predetermined voltage at the internal terminal when the internal voltage ($V_{INT}$) reaches a threshold value ($V_{TH}$).

9. The synaptic circuit of claim 1, wherein the two at least partially overlapped input pulses, the pulse of the first signal ($V_{TE}$) and the pulse ($V_{FGMAX}$) of the retroaction signal ($V_{FG}$), have opposite exponential shapes and the first signal ($V_{TE}$) further having spike events ($F_{E1}$) at the end of each pulse.

10. The synaptic circuit of claim 1, wherein the two at least partially overlapped input pulses have square shapes, the pulses of the first signal ($V_{TE}$) and the pulse ($V_{FGMAX}$) of the retroaction signal ($V_{FG}$), the first signal ($V_{TE}$) further having a spike event ($f_{e1}$) at the end of each pulse.

11. An electronic neuromorphic system comprising a multi-layer structure wherein an intermediate layer ($L_x$) comprises a first set (N) of pre-synaptic neurons and a subsequent layer ($L_{X+1}$) comprises a second set (M) of post-synaptic neurons, synaptic circuits performing spike-timing dependent plasticity (STDP) being interposed between the pre-synaptic neurons of the first set (N) and the post-synaptic neurons of the second set (M), each synaptic circuit comprising:
  a memristor having a variable resistance value (R) and being configured to receive a first signal ($V_{TE}$) from the pre-synaptic neuron;
  transistor structure connected in series with the memristor and being configured for receiving a second signal ($V_{CG}$) from the pre-synaptic neuron and being configured for providing an output signal ($I_{BE}$) to the post-synaptic neuron,
  wherein the transistor structure is further configured to receive a retroaction signal ($V_{FG}$) generated from the post-synaptic neuron, and
  the memristor is configured to modify the resistance value (R) based on a delay ($\Delta t$) between two at least partially overlapped input pulses, a spike event ($F_{E1}$) of the first signal ($V_{TE}$) and a pulse ($V_{FGMAX}$) of the retroaction signal ($V_{FG}$), in order to induct a potentiated state (STP) upon a decreasing the resistance value (R) and a depressed state (STD) upon increasing the resistance value (R) at the memristor, and
  wherein the transistor structure comprises a first transistor and a second transistor that are connected in parallel and are interposed between a first inner node and a second inner node, the first transistor has a control terminal coupled to the pre-synaptic neuron for receiving the second signal ($V_{CG}$) and the second transistor has a control terminal connected to the post-synaptic neuron for receiving the retroaction signal ($V_{FG}$), and
  wherein the memristor is a two-terminals memristor interposed between the first input terminal and the first inner node of the transistor structure.

12. The electronic neuromorphic system of claim 11, wherein the synaptic circuits are arranged in an array (NxM) comprising N-lines ($L_1$-$L_N$) and M-columns ($C_1$-$C_M$), and wherein each line comprises a pre-synaptic neuron of the first set (N) of the intermediate layer ($L_x$) and each column comprises a post-synaptic neuron of the second set (M) of the subsequent layer ($L_{X+1}$).

13. The electronic neuromorphic system of claim 12, wherein each pre-synaptic neuron of the intermediate layer ($L_x$) comprises a first output terminal configured to provide the first signal ($V_{TE}$) to each of the M synaptic circuits arranged at the same line, and configured to provide the second signal ($V_{CG}$) by a second output terminal of the M synaptic circuits of such line.

14. The electronic neuromorphic system of claim 11, wherein each post-synaptic neuron of the subsequent layer ($L_{X+1}$) comprises an input terminal configured to receive the output signal ($I_{BE}$) from each transistor structure of the N synaptic circuits arranged at the same column, and configured to provide the retroaction signal ($V_{FG}$) to each retroaction terminal of the N synaptic circuits of such column.

15. A method of performing spike timing dependent plasticity (STDP) by a synaptic circuit comprising a memristor having a variable resistance value (R), the memristor being interposed between a pre-synaptic neuron and a post-synaptic neuron, the method comprising:
  receiving a first signal ($V_{TE}$) from the pre-synaptic neuron;
  receiving a retroaction signal ($V_{FG}$) from the post-synaptic neuron, and modifying the resistance value (R) based on a delay ($\Delta t$) between two at least partially overlapped input pulses, a spike event ($F_{E1}$) of the first signal ($V_{TE}$) and a pulse ($V_{FGMAX}$) of the retroaction signal ($V_{FG}$), by inducting a potentiated state (STP) upon a decreasing the resistance value (R) and a depressed state (STD) upon increasing the resistance value (R) at the memristor (10);
  providing the synaptic circuit comprising a two terminals memristor;
  connecting a transistor structure in series with the memristor;
  receiving at the memristor the first signal ($V_{TE}$);
  receiving at the transistor structure a second signal ($V_{CG}$) from the pre-synaptic neuron;
  providing an output signal ($I_{BE}$) to the post-synaptic neuron by the intermediate unit;
  receiving the retroaction signal ($V_{FG}$) at the transistor structure;
  providing the transistor structure by comprising a first transistor and a second transistor;
  connecting the second transistor in parallel with the first transistor interposed between a first inner node and a second inner node;

connecting the memristor to the first inner node; and
connecting the post-synaptic neuron to the second node by an output terminal.

16. The method of claim 15, further comprising:
providing the synaptic circuit comprising a bipolar memristor.

17. The method of claim 15, further comprising:
decreasing the resistance value (R) when the pulse ($V_{FGMAX}$) of the retroaction signal ($V_{FG}$) is successive to the spike event ($F_{E1}$) of the first signal ($V_{TE}$) issued from the pre-synaptic neuron by providing the potentiated state (LTP) at the memristor.

18. The method of claim 15, further comprising:
increasing the resistance value (R) when the pulse ($V_{FGMAX}$) of the retroaction signal ($V_{FG}$) precedes the spike event ($F_{E1}$) of the first signal ($V_{TE}$) issued from the pre-synaptic neuron by providing the depressed state (LTD) at the memristor.

* * * * *